United States Patent
Matsubara et al.

(10) Patent No.: US 9,562,481 B2
(45) Date of Patent: Feb. 7, 2017

(54) DRIVE SYSTEM FOR HYBRID VEHICLE

(71) Applicants: Tooru Matsubara, Toyota (JP); Kenta Kumazaki, Toyota (JP); Tatsuya Imamura, Okazaki (JP); Takeshi Kitahata, Toyota (JP); Yasuhiro Hiasa, Nagoya (JP); Atsushi Tabata, Okazaki (JP)

(72) Inventors: Tooru Matsubara, Toyota (JP); Kenta Kumazaki, Toyota (JP); Tatsuya Imamura, Okazaki (JP); Takeshi Kitahata, Toyota (JP); Yasuhiro Hiasa, Nagoya (JP); Atsushi Tabata, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/648,019

(22) PCT Filed: Nov. 30, 2012

(86) PCT No.: PCT/JP2012/081197
§ 371 (c)(1),
(2) Date: May 28, 2015

(87) PCT Pub. No.: WO2014/083705
PCT Pub. Date: Jun. 5, 2014

(65) Prior Publication Data
US 2015/0322872 A1    Nov. 12, 2015

(51) Int. Cl.
*F02D 29/02* (2006.01)
*B60K 6/445* (2007.10)
(Continued)

(52) U.S. Cl.
CPC ............ *F02D 29/02* (2013.01); *B60K 6/365* (2013.01); *B60K 6/445* (2013.01); *B60K 6/547* (2013.01);
(Continued)

(58) Field of Classification Search
None
See application file for complete search history.

(56) References Cited

U.S. PATENT DOCUMENTS

| 2010/0125021 A1* | 5/2010 | Matsubara ........... F16H 61/061 477/5 |
| 2013/0090202 A1 | 4/2013 | Hiraiwa |
| 2015/0021110 A1 | 1/2015 | Ono et al. |

FOREIGN PATENT DOCUMENTS

| JP | 2000-346187 A | 12/2000 |
| JP | 2009-190694 A | 8/2009 |

(Continued)

OTHER PUBLICATIONS

International Search Report issued Jan. 15, 2013, in PCT/JP2012/081197, filed Nov. 30, 2012.

*Primary Examiner* — Mussa A Shaawat
*Assistant Examiner* — Kyung Kim
(74) *Attorney, Agent, or Firm* — Oblon, McClelland, Maier & Neustadt, L.L.P.

(57) ABSTRACT

In a drive system, a first differential mechanism transmits engine rotation, a second differential mechanism connects the first differential mechanism with drive wheels, and a switching device changes a speed ratio of the first differential mechanism. The second differential mechanism has first, second, and third rotational elements, which connect respectively to the first differential mechanism, a first rotating machine, and a second rotating machine. In a first running condition, the vehicle runs using the second rotating machine as a power source, while differentially operating the (Continued)

first differential mechanism. In a second running condition, the vehicle runs using the second rotating machine as a power source, without differentially operating the first differential mechanism. A region in which the vehicle runs in the second running condition in the case where the engine cannot start by itself is larger than that in the case where the engine can start by itself.

6 Claims, 9 Drawing Sheets

(51) Int. Cl.
    *B60K 6/365*     (2007.10)
    *B60W 10/06*     (2006.01)
    *B60W 10/10*     (2012.01)
    *B60W 20/00*     (2016.01)
    *F16H 3/72*     (2006.01)
    *B60K 6/547*     (2007.10)
    *B60W 10/08*     (2006.01)
    *F16H 37/08*     (2006.01)

(52) U.S. Cl.
    CPC .............. *B60W 10/06* (2013.01); *B60W 10/08* (2013.01); *B60W 10/10* (2013.01); *B60W 20/00* (2013.01); *B60W 20/40* (2013.01); *F16H 3/728* (2013.01); *F16H 2037/0873* (2013.01); *F16H 2200/2007* (2013.01); *F16H 2200/2035* (2013.01); *Y02T 10/6239* (2013.01); *Y10S 903/905* (2013.01)

(56) References Cited

FOREIGN PATENT DOCUMENTS

| | | |
|---|---|---|
| JP | 2012-153192 A | 8/2012 |
| JP | 2012-224238 A | 11/2012 |
| WO | WO 2013/114594 A1 | 8/2013 |

* cited by examiner

| DRIVE STATE | | | CL1 | BK1 | MG1 | MG2 |
|---|---|---|---|---|---|---|
| EV | FORWARD | SINGLE MOTOR | △ | △ | G | M |
| | | BOTH MOTOR | O | O | M | M |
| | REVERSE | SINGLE MOTOR | | | | M |
| | | BOTH MOTOR | O | O | M | M |
| HV | FORWARD | DIFFERENTIAL LOW | O | | G | M |
| | | DIFFERENTIAL HIGH | | O | G | M |
| | REVERSE | LOW | O | | G | M |

O: ENGAGED  △: CL1 OR BK1 ENGAGED WHEN ENGINE BRAKE IS USED
G: MAINLY AS GENERATOR WHEN DRIVEN  M: MAINLY AS MOTOR WHEN DRIVEN

DRIVE SYSTEM FOR HYBRID VEHICLE

TECHNICAL FIELD

This invention relates to a drive system for a hybrid vehicle.

BACKGROUND ART

Conventionally, there are hybrid vehicles. For example, Patent Document 1 discloses a technology of a drive system of a hybrid vehicle including a speed changing mechanism that changes the speed of rotation of an internal combustion engine and transmits the rotation to a power distribution mechanism, a first transmission shaft that transmits power from the internal combustion engine to the speed changing mechanism, and a second transmission shaft that transmits power delivered from the speed changing mechanism to the power distribution mechanism. In the drive system of the hybrid vehicle of Patent Document 1, the speed changing mechanism has a differential mechanism in which two sets of planetary gear units are combined, a first brake B1 that can stop rotation of a ring gear R1 of the differential mechanism, a second brake B2 that can stop rotation of a ring gear R2, and a clutch C that permits or inhibits power transmission from the first transmission shaft to the ring gear R1.

PRIOR ART DOCUMENT

Patent Document 1: Japanese Patent Application Publication No. 2009-190694

SUMMARY OF THE INVENTION

Problem to be Solved by the Invention

In a hybrid vehicle having an engine that can start by itself, it is desirable that a delay in starting of the engine can be reduced. For example, in a hybrid vehicle having a clutch that can disconnect the engine from the rest of the vehicle, it is preferable that a delay in starting of the engine can be reduced even in a situation where the engine cannot start by itself.

An object of the invention is to provide a drive system for a hybrid vehicle in which a delay in starting of an engine can be reduced.

Arrangement for Solving the Problem

A drive system for a hybrid vehicle of the invention is characterized by including an engine, a first differential mechanism that is connected to the engine, and transmits rotation of the engine, a second differential mechanism that connects the first differential mechanism with drive wheels, a switching device that changes a speed ratio of the first differential mechanism, a first running condition, and a second running condition. The drive system is characterized in that the second differential mechanism has a first rotational element connected to an output element of the first differential mechanism, a second rotational element connected to a first rotating machine, and a third rotational element connected to a second rotating machine and the drive wheels, the first running condition is a running condition in which the vehicle runs using the second rotating machine as a power source, while differentially operating the first differential mechanism, the second running condition is a running condition in which the vehicle runs using the second rotating machine as a power source, without differentially operating the first differential mechanism, and a region in which the vehicle runs in the second running condition in the case where the engine cannot start by itself is larger than that in the case where the engine can start by itself.

In the drive system for the hybrid vehicle as described above, it is preferable that the region in which the vehicle runs in the second running condition is a higher-load-side region than a region in which the vehicle runs in the first running condition.

In the drive system for the hybrid vehicle as described above, it is preferable that, when the engine cannot start by itself, a region in which the vehicle runs in the first running condition has a region in which the vehicle runs while rotating the first rotating machine, and a region in which the vehicle runs without rotating the first rotating machine.

In the drive system for the hybrid vehicle as described above, it is preferable that the region in which the vehicle runs in the second running condition in the case where a driver's intention to accelerate the vehicle is large is larger than that in the case where the driver's intention to accelerate the vehicle is small.

In the drive system for the hybrid vehicle as described above, it is preferable that the region in which the vehicle runs while rotating the first rotating machine is larger in the case where the driver's intention to accelerate the vehicle is large than that in the case where the driver's intention to accelerate the vehicle is small.

In the drive system for the hybrid vehicle as described above, it is preferable that the region in which the vehicle runs while rotating the first rotating machine is provided between the region in which the vehicle runs without rotating the first rotating machine, and the region in which the vehicle runs in the second running condition, and in the region in which the vehicle runs while rotating the first rotating machine, a rotational speed of the first rotational element is smaller in a region close to the region in which the vehicle runs in the second running condition, than that in a region remote from the region in which the vehicle runs in the second running condition.

Effect of the Invention

The drive system for the hybrid vehicle according to the invention includes the first running condition in which the vehicle runs using the second rotating machine as the power source and differentially operating the first differential mechanism, and the second running condition in which the vehicle runs using the second rotating machine as the power source, without differentially operating the first differential mechanism. In the case where the engine cannot start by itself, the region in which the vehicle runs in the second running condition is larger than that in the case where the engine can start by itself. The drive system for the hybrid vehicle according to the invention yields an effect of reducing a delay in starting of the engine.

MODES FOR CARRYING OUT THE INVENTION

In the following, a drive system for a hybrid vehicle according to one embodiment of the invention will be described in detail with reference to the drawings. It is to be understood that this invention should not be limited to this embodiment. Also, constituent elements in the following embodiment include those that can be easily conceived by a person skilled in the art, or those that are substantially the same elements.

Embodiment

Figure 1:
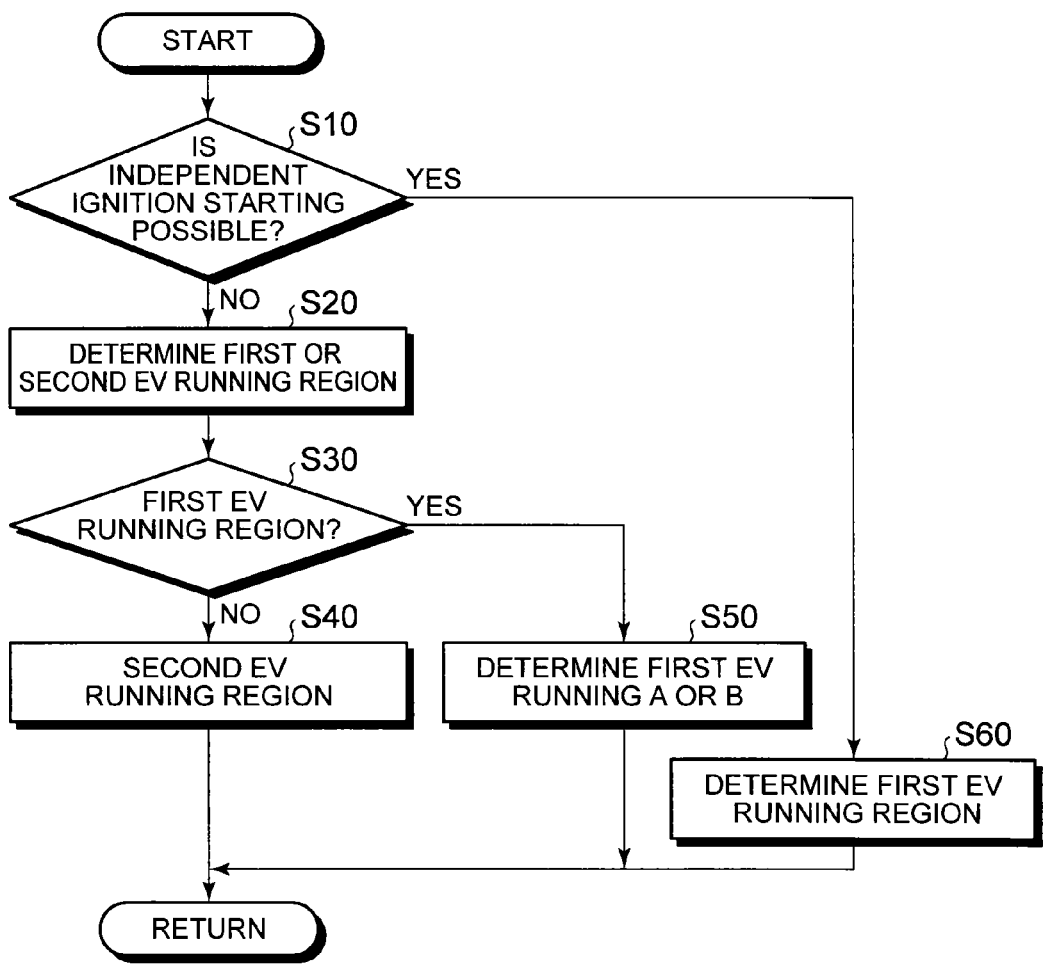
FIG. 1 is a flowchart illustrating operation of a drive system for a hybrid vehicle according to one embodiment.
Figure 5:
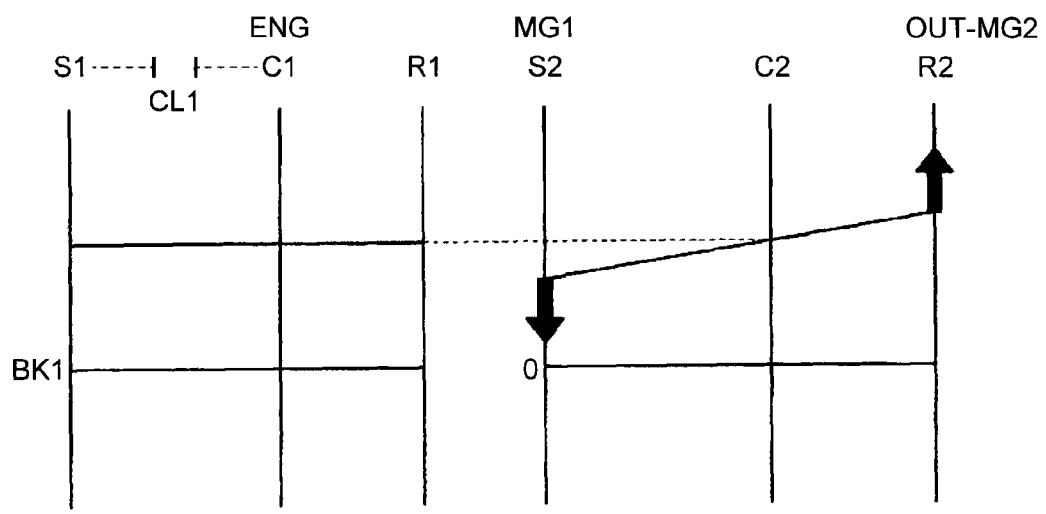
FIG. 5 is a nomographic chart concerning an HV LOW mode.
Figure 6:
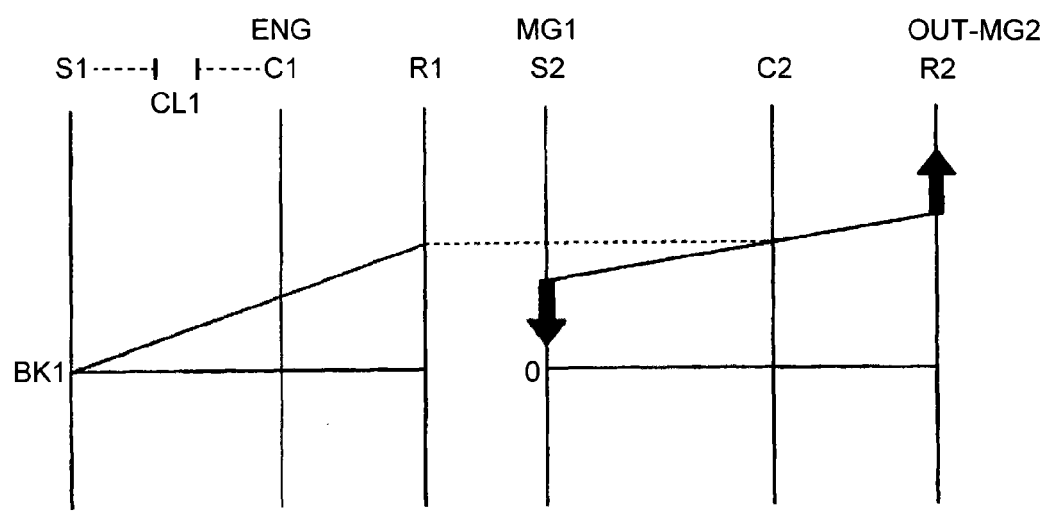
FIG. 6 is a nomographic chart concerning an HV HIGH mode.
Figure 7:
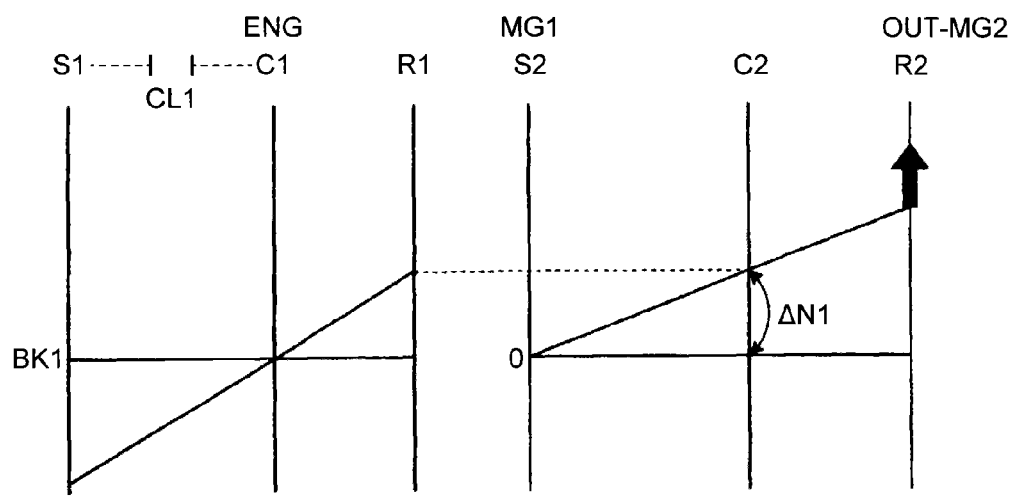
FIG. 7 is a nomographic chart concerning an MG-stopped first running condition of a single-motor EV mode.
Figure 8:
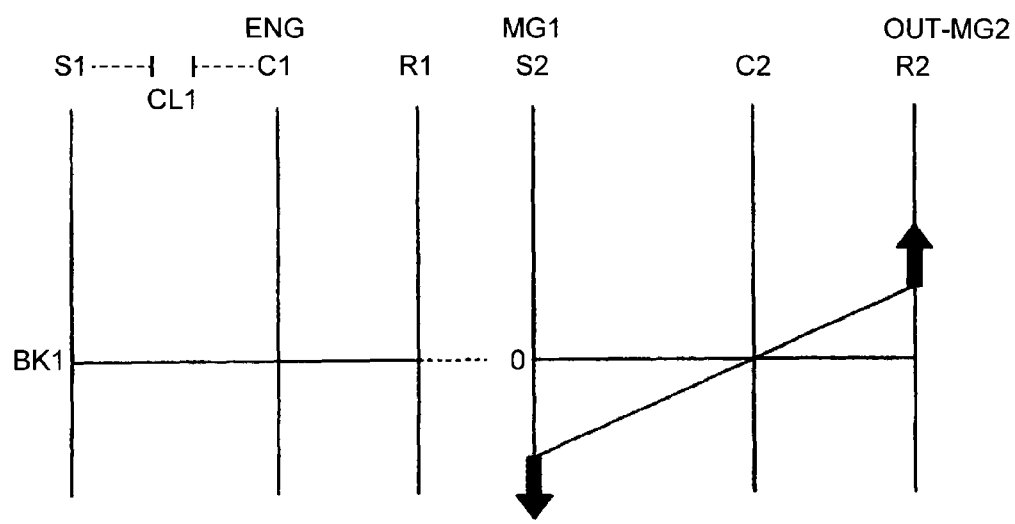
FIG. 8 is a nomographic chart concerning a both-drive EV mode.
Figure 9:
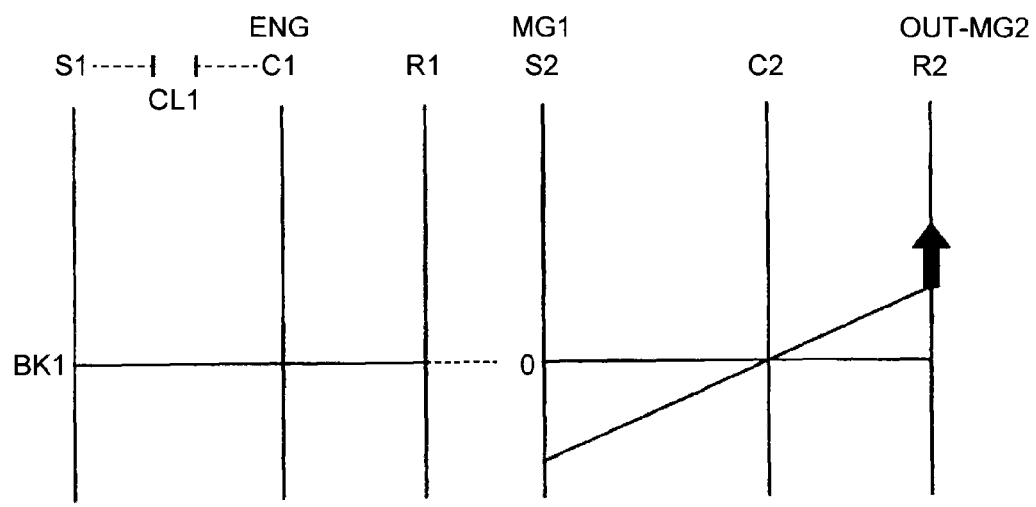
FIG. 9 is a nomographic chart concerning a second running condition of the single-motor EV mode.
Figure 10:
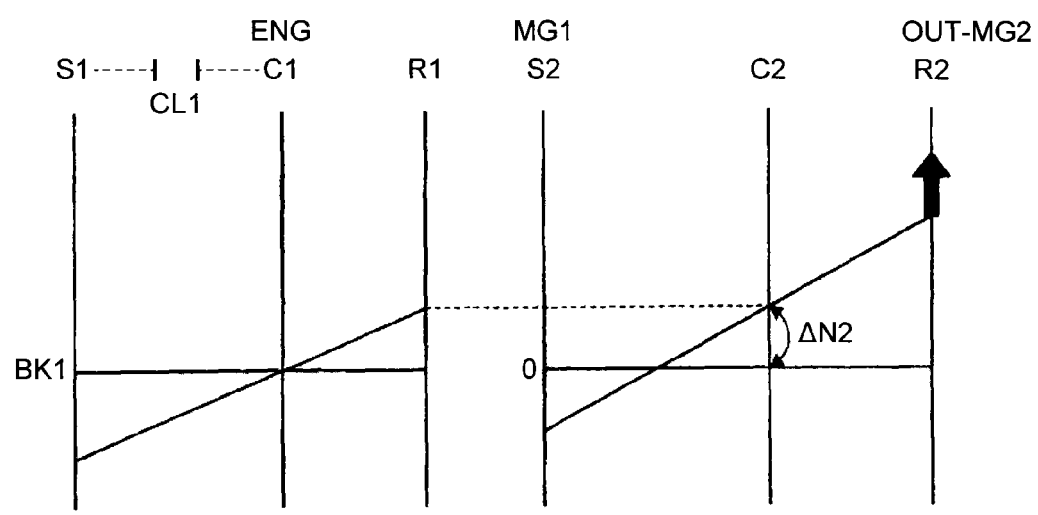
FIG. 10 is a nomographic chart concerning an MG-rotated first running condition of the single-motor EV mode.
Figure 11:
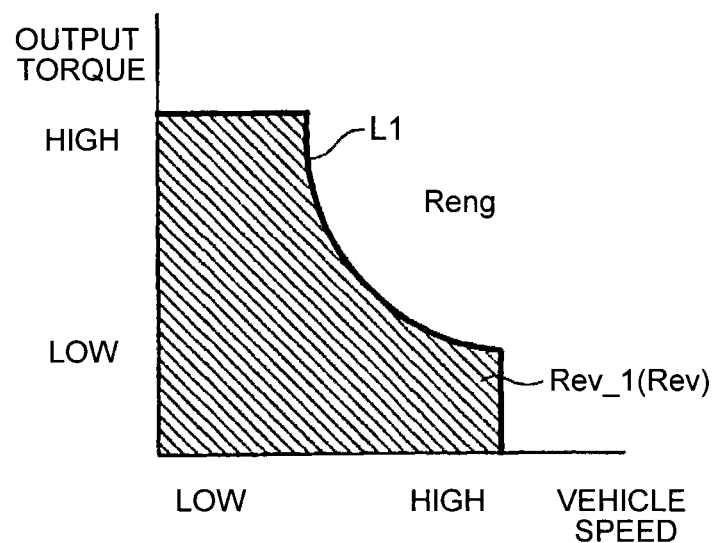
FIG. 11 is a view showing a running region in which an engine can start by itself.
Figure 12:
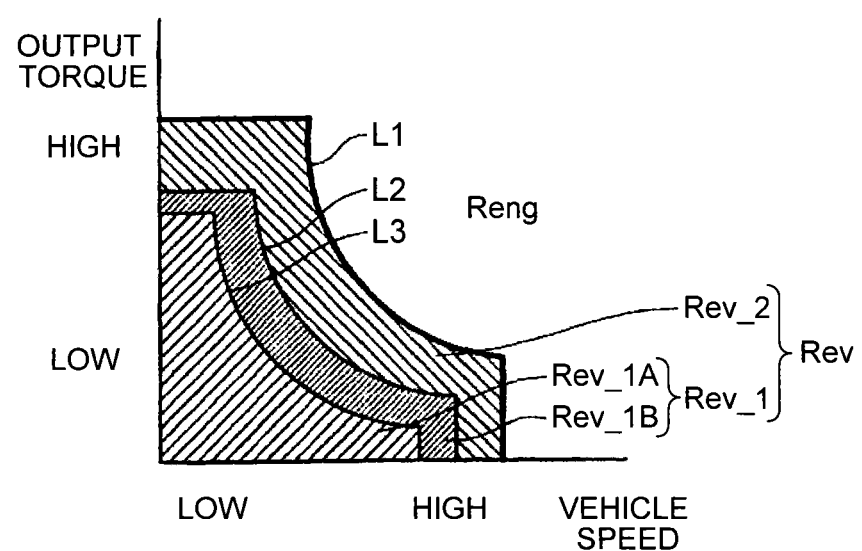
FIG. 12 is a view showing a running region in which the engine cannot start by itself.
Figure 13:
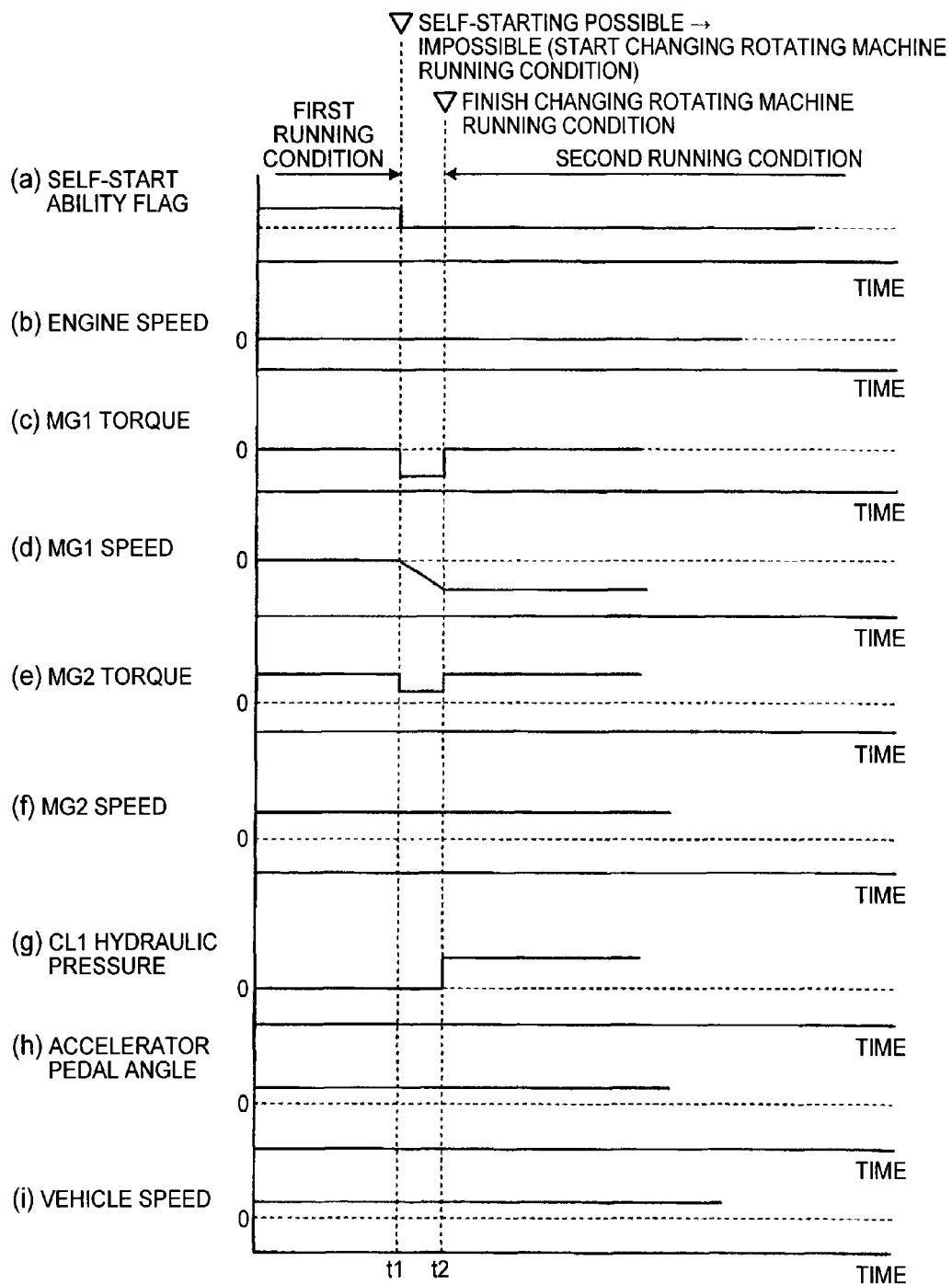
FIG. 13 is a time chart concerning control of the embodiment.

Referring to FIG. 1 through FIG. 14, the embodiment will be described. This embodiment relates to a drive system for a hybrid vehicle. FIG. 1 is a flowchart illustrating operation of the drive system for the hybrid vehicle according to the embodiment of the invention, FIG. 2 is a skeleton diagram of the vehicle according to the embodiment, FIG. 3 is a view of input-output relationships of the vehicle according to the embodiment, FIG. 4 is a view showing an operation engagement table of the drive system for the hybrid vehicle according to the embodiment, FIG. 5 is a nomographic chart concerning an HV LOW mode, FIG. 6 is a nomographic chart concerning an HV HIGH mode, FIG. 7 is a nomographic chart concerning an MG-stopped first running condition of a single-motor EV mode, FIG. 8 is a nomographic chart concerning a both-drive EV mode, FIG. 9 is a nomographic chart concerning a second running condition of the single-motor EV mode, FIG. 10 is a nomographic chart concerning an MG-rotated first running condition of the single-motor EV mode, FIG. 11 is a view showing a running region in which the vehicle can start by itself, FIG. 12 is a view showing a running region in which the vehicle cannot start by itself, and FIG. 13 is a time chart concerning control of the embodiment.

Figure 2:
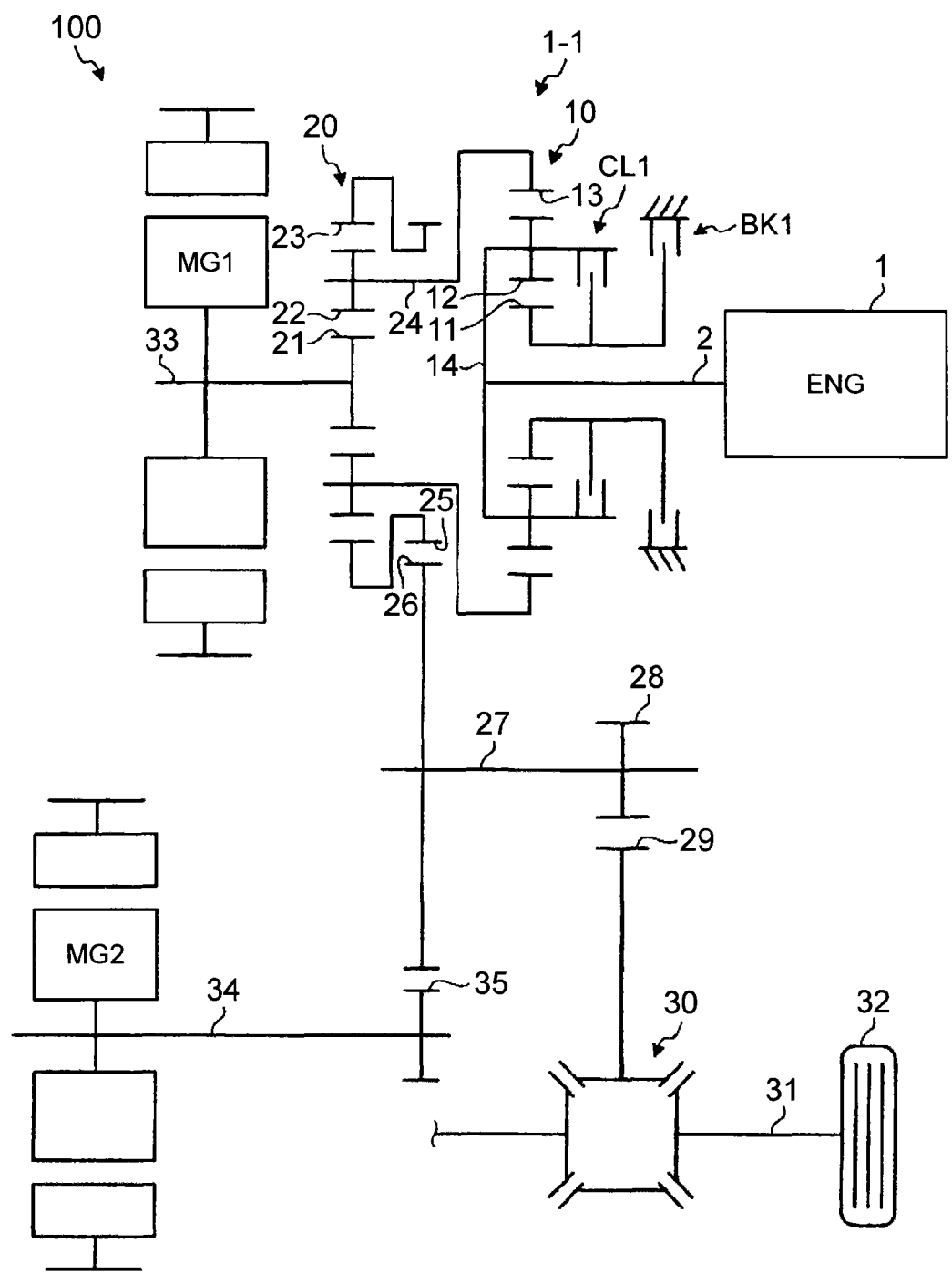
FIG. 2 is a skeleton diagram of a vehicle according to the embodiment.
Figures 3, 4:
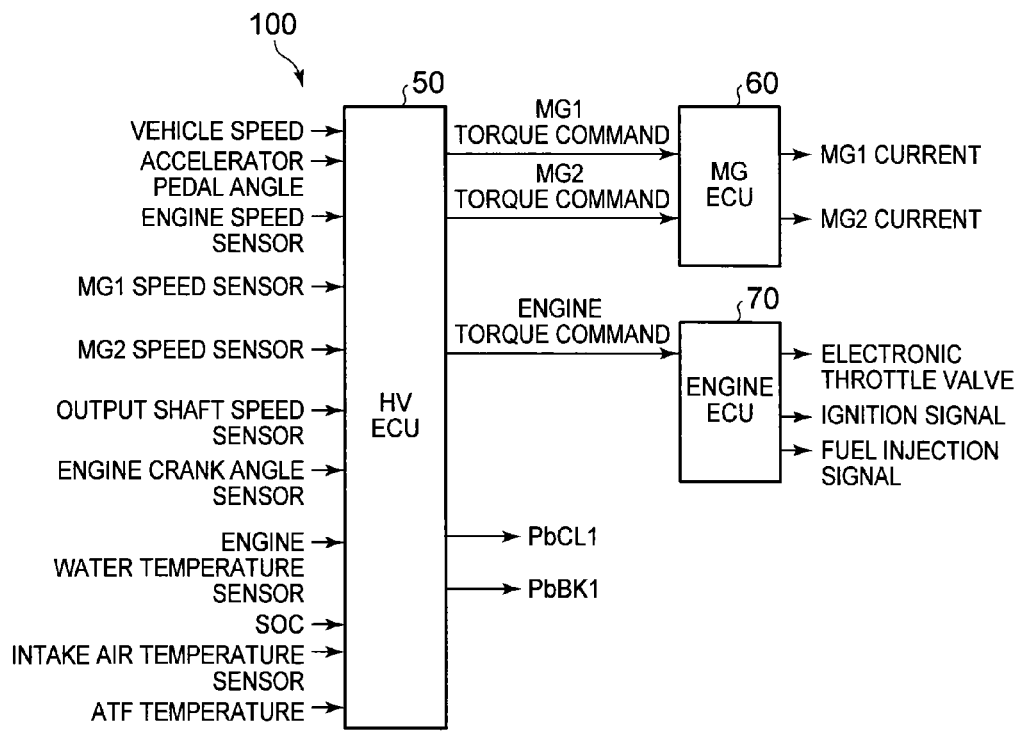
FIG. 3 is a view of input-output relationships of the vehicle according to the embodiment.
FIG. 4 is a view showing an operation engagement table of the drive system for the hybrid vehicle according to the embodiment.

As shown in FIG. 2, a vehicle 100 according to this embodiment is a hybrid vehicle (HV) having an engine 1, a first rotating machine MG1, and a second rotating machine MG2, as power sources. The vehicle 100 may be a plug-in hybrid vehicle (PHV) that can be charged with power supplied from an external power supply. As shown in FIG. 2 and FIG. 3, the vehicle 100 includes the engine 1, first planetary gear unit 10, second planetary gear unit 20, first rotating machine MG1, second rotating machine MG2, clutch CL1, brake BK1, HV_ECU 50, MG_ECU 60, and an engine_ECU 70.

A drive system 1-1 for the hybrid vehicle according to this embodiment includes the engine 1, first planetary gear unit 10, second planetary gear unit 20, clutch CL1, and the brake BK1. The drive system 1-1 for the hybrid vehicle may further include control units, such as the respective ECUs 50, 60, 70. The drive system 1-1 for the hybrid vehicle can be used in an FF (front-engine, front-drive) vehicle, or an RR (rear-engine, rear-drive) vehicle, or the like. For example, the drive system 1-1 for the hybrid vehicle is installed on the vehicle 100 such that its axial direction corresponds to the vehicle width direction.

In the drive system 1-1 for the hybrid vehicle according to this embodiment, a speed changing unit is arranged to include the first planetary gear unit 10, clutch CL1, and the brake BK1. Also, a differential unit is arranged to include the second planetary gear unit 20. The clutch CL1 and the brake BK1 are included in a switching device for changing the speed ratio of the first planetary gear unit 10.

The engine 1 as an engine converts combustion energy of fuel into rotary motion of an output shaft, and delivers the rotary motion. The output shaft of the engine 1 is connected to an input shaft 2. The input shaft 2 is an input shaft of a power transmission system. The power transmission system includes the first rotating machine MG1, second rotating machine MG2, clutch CL1, brake BK1, differential device 30, and so forth. The input shaft 2 is disposed coaxially with the output shaft of the engine 1, on an extended line of the output shaft. The input shaft 2 is connected to a first carrier 14 of the first planetary gear unit 10.

The first planetary gear unit 10 of this embodiment is connected to the engine 1, and is installed on the vehicle 100 as a first differential mechanism that transmits rotation of the engine 1. The first planetary gear unit 10 is an input-side differential mechanism located closer to the engine 1 than the second planetary gear unit 20. The first planetary gear unit 10 is able to change the speed of rotation of the engine 1 and deliver the rotation. The first planetary gear unit 10 is of a single pinion type, and has a first sun gear 11, a first pinion gear 12, a first ring gear 13, and the first carrier 14.

The first ring gear 13, which is on the same axis as the first sun gear 11, is disposed radially outwardly of the first sun gear 11. The first pinion gear 12 is disposed between the first sun gear 11 and the first ring gear 13, and engages with the first sun gear 11 and the first ring gear 13, respectively. The first pinion gear 12 is rotatably supported by the first carrier 14. The first carrier 14 is coupled to the input shaft 2, and rotates as a unit with the input shaft 2. Accordingly, the first pinion gear 12 can rotate (orbit) about the center axis of the input shaft 2, along with the input shaft 2, and can also rotate about the center axis of the first pinion gear 12 (rotate about itself) while being supported by the first carrier 14.

The clutch CL1 is a clutch device that can couple the first sun gear 11 with the first carrier 14. While the clutch CL1 may be a friction engagement type clutch, for example, it is not limited to this type of clutch, but a clutch device, such as a meshing clutch, may be used as the clutch CL1. For example, the clutch CL1 is hydraulically controlled to be engaged or released. The clutch CL1, when it is in a fully engaged state, couples the first sun gear 11 with the first carrier 14, so that the first sun gear 11 and the first carrier 14 can rotate as a unit. The clutch CL1 in the fully engaged state inhibits differential operation of the first planetary gear unit 10. On the other hand, the clutch CL1, when it is in a released state, disconnects the first sun gear 11 and the first carrier 14 from each other, so as to allow the first sun gear 11 and the first carrier 14 to rotate relative to each other. Namely, the clutch CL1 in the released state allows differential operation of the first planetary gear unit 10. The clutch CL1 can be controlled to a half-engaged state. The clutch CL1 in the half-engaged state allows differential operation of the first planetary gear unit 10.

The brake BK1 is a brake device that can inhibit rotation of the first sun gear 11. The brake BK1 has an engaging element connected to the first sun gear 11, and an engaging element connected to the vehicle body side, e.g., a case of the power transmission system. While the brake BK1 may be a friction engagement type clutch device like the clutch CL1, a clutch device, such as a meshing clutch, may be used as the brake BK1. For example, the brake BK1 is hydraulically controlled to be engaged or released. The brake BK1, when it is in a fully engaged state, can couple the first sun gear 11 with the vehicle body side, so as to inhibit rotation of the first sun gear 11. On the other hand, the brake BK1, when it is in a released state, disconnects the first sun gear 11 from the vehicle body side, so as to allow rotation of the first sun gear 11. The brake BK1 can be controlled to a half-engaged state. The brake BK1 in the half-engaged state allows rotation of the first sun gear 11.

The second planetary gear unit 20 of this embodiment is installed on the vehicle 100 as a second differential mechanism that connects the first planetary gear unit 10 with drive wheels 32. The second planetary gear unit 20 is an output-side differential mechanism located closer to the drive wheels 32 than the first planetary gear unit 10. The second planetary gear unit 20 is of a single pinion type, and has a second sun gear 21, a second pinion gear 22, a second ring gear 23, and a second carrier 24. The second planetary gear unit 20 is disposed coaxially with the first planetary gear unit 10, and is opposed to the engine 1 with the first planetary gear unit 10 interposed therebetween.

The second ring gear 23, which is on the same axis as the second sun gear 21, is disposed radially outwardly of the second sun gear 21. The second pinion gear 22 is disposed between the second sun gear 21 and the second ring gear 23, and meshes with the second sun gear 21 and the second ring gear 23, respectively. The second pinion gear 22 is rotatably supported by the second carrier 24. The second carrier 24 is connected to the first ring gear 13, and rotates as a unit with the first ring gear 13. The second pinion gear 22 can rotate (orbit) about the center axis of the input shaft 2, along with the second carrier 24, and can also rotate about the center axis of the second pinion gear 22 (rotate about itself) while being supported by the second carrier 24. The first ring gear 13 is an output element of the first planetary gear unit 10, and can deliver rotation received by the first planetary gear unit 10 from the engine, to the second carrier 24. The second carrier 24 corresponds to a first rotational element connected to the output element of the first planetary gear unit 10.

A rotary shaft 33 of the first rotating machine MG1 is connected to the second sun gear 21. The rotary shaft 33 of the first rotating machine MG1 is disposed coaxially with the input shaft 2, and rotates as a unit with the second sun gear 21. The second sun gear 21 corresponds to a second rotational element connected to the first rotating machine MG1. A counter drive gear 25 is connected to the second ring gear 23. The counter drive gear 25 is an output gear that rotates as a unit with the second ring gear 23. The second ring gear 23 corresponds to a third rotational element connected to the second rotating machine MG2 and the drive wheels 32. The second ring gear 23 is an output element that can deliver rotation received from the first rotating machine MG1 or the first planetary gear unit 10, to the drive wheels 32.

The counter drive gear 25 meshes with a counter driven gear 26. The counter driven gear 26 is connected to a drive pinion gear 28 via a counter shaft 27. The counter driven gear 26 and the drive pinion gear 28 rotate as a unit. Also, a reduction gear 35 meshes with the counter driven gear 26. The reduction gear 35 is connected to a rotary shaft 34 of the second rotating machine MG2. Namely, rotation of the second rotating machine MG2 is transmitted to the counter driven gear 26 via the reduction gear 35. The reduction gear 35, which has a smaller diameter than the counter driven gear 26, reduces the speed of rotation of the second rotating machine MG2, and transmits the rotation to the counter driven gear 26.

The drive pinion gear 28 meshes with a differential ring gear 29 of the differential device 30. The differential device 30 is connected to the drive wheels 32 via right and left drive axles 31. The second ring gear 23 is connected to the drive wheels 32, via the counter drive gear 25, counter driven gear 26, drive pinion gear 28, differential device 30, and the drive axles 31. Also, the second rotating machine MG2 is connected to a power transmission pathway between the second ring gear 23 and the drive wheels 32, and is able to transmit power to the second ring gear 23 and the drive wheels 32, respectively.

Each of the first rotating machine MG1 and the second rotating machine MG2 functions as a motor (electric motor) and also function as a generator. The first rotating machine MG1 and the second rotating machine MG2 are connected to a battery via inverters. The first rotating machine MG1 and the second rotating machine MG2 can convert electric power supplied from the battery into mechanical power, and deliver the mechanical power, and can also convert mechanical power into electric power when driven by power received. The electric power generated by the rotating machines MG1, MG2 can be stored in the battery. As the first rotating machine MG1 and second rotating machine MG2, AC synchronous motor-generators may be used, for example.

In the vehicle 100 of this embodiment, the brake BK1, clutch CL1, first planetary gear unit 10, counter drive gear 25, second planetary gear unit 20, and the first rotating machine MG1 are arranged in this order as viewed from one side close to the engine 1, on the same axis as the engine 1. Also, the drive system 1-1 of this embodiment is of a plural-axis type in which the input shaft 2 and the rotary shaft 34 of the second rotating machine MG2 are located on different axes.

As shown in FIG. 3, the vehicle 100 has the HV_ECU 50, MG_ECU 60, and the engine_ECU 70. Each of the ECUs 50, 60, 70 is an electronic control unit having a computer. The HV_ECU 50 has a function of performing integrated control on the vehicle 100 as a whole. The MG_ECU 60 and the engine_ECU 70 are electrically connected to the HV_ECU 50.

The MG_ECU 60 can control the first rotating machine MG1 and the second rotating machine MG2. For example, the MG_ECU 60 can adjust a value of current supplied to the first rotating machine MG1, so as to control output torque of the first rotating machine MG1, and can adjust a value of current supplied to the second rotating machine MG2, so as to control output torque of the second rotating machine MG2.

The engine_ECU 70 can control the engine 1. For example, the engine_ECU 70 can control the opening of an electronic throttle valve of the engine 1, output an ignition signal so as to perform ignition control of the engine 1, and perform fuel injection control, etc. on the engine 1. The engine_ECU 70 can control the output torque of the engine 1, through the opening control of the electronic throttle valve, injection control, ignition control, and so forth.

To the HV_ECU 50 are connected a vehicle speed sensor, accelerator pedal position sensor, engine speed sensor, MG1 speed sensor, MG2 speed sensor, output shaft speed sensor, engine crank angle sensor, engine water temperature sensor, battery sensor, intake air temperature sensor, ATF temperature sensor, and so forth. From these sensors, the HV_ECU 50 can obtain the vehicle speed, accelerator pedal angle, engine speed, rotational speed of the first rotating machine MG1, rotational speed of the second rotating machine MG2, engine crank angle, engine water temperature, rotational speed of the output shaft of the power transmission system, SOC of the battery, intake air temperature, ATF temperature, and so forth.

The HV_ECU 50 can calculate required driving force, required power, required torque, etc., which are required to be generated by the vehicle 100, based on the information thus obtained. The HV_ECU 50 determines the output torque of the first rotating machine MG1 (which will also be denoted as "MG1 torque"), the output toque of the second rotating machine MG2 (which will also be denoted as "MG2 torque"), and the output torque of the engine 1 (which will also be denoted as "engine torque"), based on the required values thus calculated. The HV_ECU 50 outputs a command value of the MG1 torque and a command value of the MG2 torque to the MG_ECU 60. Also, the HV_ECU 50 outputs a command value of the engine torque to the engine_ECU 70.

The HV_ECU 50 controls the clutch CL1 and the brake BK1, respectively, based on a running mode, etc. which will be described later. The HV_ECU 50 outputs a command value of a hydraulic pressure (engaging pressure) PbCL1 supplied to the clutch CL1, and a command value of a hydraulic pressure (engaging pressure) PbBK1 supplied to the brake BK1. A hydraulic control device that is not illustrated controls the hydraulic pressures supplied to the clutch CL1 and the brake BK1, according to the command values of the respective hydraulic pressures PbCL1, PbBK1 to be supplied.

The vehicle 100 is able to selectively perform hybrid (HV) running or EV running. The HV running is a running mode in which the vehicle 100 runs using the engine 1 as a power source. In the HV running, the second rotating machine MG2 may be further used as a power source, in addition to the engine 1.

The EV running is a running mode in which the vehicle 100 runs using at least one of the first rotating machine MG1 and the second rotating machine MG2 as a power source(s). In the EV running, the vehicle 100 is able to run with the engine 1 stopped. The drive system 1-1 for the hybrid vehicle according to this embodiment has a single-motor EV mode (single-drive EV mode) in which the vehicle 100 runs using the second rotating machine MG2 as a single power source, and a both-drive EV mode (both-motor EV mode) in which the vehicle 100 runs using the first rotating machine MG1 and the second rotating machine MG2 as power sources.

In the engagement table of FIG. 4, circles in some columns of the clutch CL1 and some columns of the brake BK1 indicate engagement, and blanks indicate release. Also, triangles indicate engagement of one of the clutch CL1 and the brake BK1 and release of the other. In the HV running, the second planetary gear unit 20 as the differential unit is basically placed in a differentially operating condition, and the first planetary gear unit 10 as the speed changing unit is switched between LOW and HIGH. FIG. 5 is a nomographic chart concerning the HV running mode in the LOW state (which will also be denoted as "HV LOW mode"), and FIG. 6 is a nomographic chart concerning the HV running mode in the HIGH state (which will also be denoted as "HV HIGH mode"). In the nomographic charts, symbols S1, C1, R1 represent the first sun gear 11, the first carrier 14, and the first ring gear 13, respectively, and symbols S2, C2, R2 represent the second sun gear 21, the second carrier 24, and the second ring gear 23, respectively.

In the HV LOW mode, the HV_ECU 50 engages the clutch CL1, and releases the brake BK1. With the clutch CL1 thus engaged, differential operation of the first planetary gear unit 10 is inhibited, and the rotational elements 11, 13, 14 rotate as a unit. Accordingly, the speed of rotation of the engine 1 is not increased nor reduced, and the rotation of the engine 1 is transmitted at the same speed from the first ring gear 13 to the second carrier 24.

In the HV HIGH mode, on the other hand, the HV_ECU 50 releases the clutch CL1, and engages the brake BK1. With the brake BK1 thus engaged, rotation of the first sun gear 11 is inhibited. As a result, the first planetary gear unit 10 is brought into an overdrive (OD) state in which the rotation of the engine 1 received by the first carrier 14 is increased in speed and delivered from the first ring gear 13. Thus, the first planetary gear unit 10 is able to deliver rotation of the engine 1 while increasing the speed of rotation of the engine 1. The speed ratio of the first planetary gear unit 10 in the overdrive (OD) state may be set to, for example, 0.7.

The single-motor EV mode is established by releasing both the clutch CL1 and the brake BK1. FIG. 7 is a nomographic chart concerning a MG-stopped first running condition that will be described later, as one of the single-motor EV mode. In the first running condition of the single-motor EV mode, the clutch CL1 and the brake BK1 are released. With the brake BK1 thus released, the first sun gear 11 is allowed to rotate. With the clutch CL1 thus released, the first planetary gear unit 10 is able to perform differential operation. The HV_ECU 50 causes the second rotating machine MG2 to produce positive torque, via the MG_ECU 60, so as to generate forward driving force in the vehicle 100. The second ring gear 23 rotates in the positive direction in accordance with rotation of the drive wheels 32. The positive direction mentioned herein is the direction of rotation of the second ring gear 23 when the vehicle 100 runs forward.

The HV_ECU 50 causes the first rotating machine MG1 to operate as a generator, so as to reduce a drag loss. More specifically, the HV_ECU 50 applies slight torque to the first rotating machine MG1 so that the first rotating machine MG1 generates electric power while the rotational speed of the first rotating machine MG1 is substantially equal to 0. Thus, the vehicle is able to run without rotating the first rotating machine MG1. In this manner, the drag loss of the first rotating machine MG1 can be reduced.

While it is preferable that the MG1 rotational speed when the vehicle runs without rotating the first rotating machine MG1 is equal to 0, the invention is not limited to this. For example, running the vehicle without rotating the first rotating machine MG1 may include running the vehicle while varying the MG1 speed within a given range according to the accuracy of rotational speed control of the first rotating machine MG1. As one example, running the vehicle without rotating the first rotating machine MG1 includes running the vehicle 100 in a condition where the MG1 speed varies within the range of +50 rpm to −50 rpm.

If it is possible to keep the MG1 speed substantially equal to 0 (or within a given range) by utilizing cogging torque even when the MG1 torque is equal to 0, the MG1 torque may not be applied. The MG1 speed may also be made equal to 0 (or within a given range) by locking the d-axis of the first rotating machine MG1.

The first ring gear 13 is forced to rotate in the positive direction along with the second carrier 24. Since the first planetary gear unit 10 is in a neutral state where the clutch CL1 and the brake BK1 are released, the engine 1 is not forced to rotate, and rotation of the first carrier 14 is stopped. Accordingly, a large amount of regenerative energy can be taken. The first sun gear 11 rotates idle in the negative direction. The neutral state of the first planetary gear unit 10 is a state in which power is not transmitted between the first ring gear 13 and the first carrier 14, namely, a state in which the engine 1 and the second planetary gear unit 20 are disconnected from each other, and power transmission therebetween is cut off. If at least one of the clutch CL1 and the brake BK1 is engaged, the first planetary gear unit 10 is placed in a connecting state for connecting the engine 1 with the second planetary gear unit 20.

During running in the single-motor EV mode, the state of charge of the battery may become full, and the battery may not be able to take regenerative energy any more. In this case, engine brake may be used at the same time. By engaging the clutch CL1 or the brake BK1, it is possible to connect the engine 1 with the drive wheels 32, and apply engine brake to the drive wheels 32. If the clutch CL1 or brake BK1 is engaged in the single-motor EV mode, as indicated by the triangles in FIG. 4, the engine 1 is forced to rotate, and the engine speed is raised by the first rotating machine MG1 so that the vehicle is brought into an engine brake condition.

In the both-drive EV mode, the HV_ECU 50 engages the clutch CL1 and the brake BK1. In the both-drive EV mode as shown in FIG. 8, the clutch CL1 is engaged, so that differential operation of the first planetary gear unit 10 is inhibited, and the brake BK1 is engaged, so that rotation of the first sun gear 11 is inhibited. Accordingly, rotation of all rotational elements of the first planetary gear unit 10 is stopped. Since rotation of the first ring gear 13 as the output element is inhibited, the second carrier 24 connected to the first ring gear 13 is locked, i.e., its rotational speed becomes equal to 0.

The HV_ECU 50 causes the first rotating machine MG1 and the second rotating machine MG2 to produce torque for driving the vehicle. The second carrier 24, which is inhibited from rotating, takes reaction force against the torque of the first rotating machine MG1, so that the torque of the first rotating machine MG1 can be delivered from the second ring gear 23. The first rotating machine MG1 produces negative torque and rotates in the negative direction when the vehicle runs forward, so that positive torque can be delivered from the second ring gear 23. When the vehicle runs backward, on the other hand, the first rotating machine MG1 produces positive torque and rotates in the positive direction, so that negative torque can be delivered from the second ring gear 23.

As described above, the switching device consisting of the clutch CL1 and the brake BK1 switches the first planetary gear unit 10 between a condition where differential operation of the first planetary gear unit 10 is inhibited, and a condition where differential operation of the first planetary gear unit 10 is allowed, so as to change the speed ratio of the first planetary gear unit 10. The drive system 1-1 for the hybrid vehicle can be switched between the HV HIGH mode and the HV LOW mode, by the speed changing unit including the first planetary gear unit 10, clutch CL1 and the brake BK1, so as to improve the transmission efficiency of the vehicle 100. Also, the second planetary gear unit 20 as the differential unit is connected in series with the downstream side of the speed changing unit. Since the first planetary gear unit 10 is operable in the overdrive state, the first rotating machine MG1 need not provide significantly increased torque.

For example, the HV_ECU 50 selects EV running, in a low-load motor running region in which the vehicle speed is low and the required driving force is small. In the motor running region, the single-motor EV mode is selected at a low load, and the both-drive EV mode is selected at a high load. A region in which the vehicle speed and the load are higher than those of the motor running region is an engine running region. The HV_ECU 50 selects the HV LOW mode in a low- and middle-vehicle-speed, high-load region of the engine running region, and selects the HV HIGH mode in a high-vehicle-sped, low-load region. By placing the speed changing unit in the overdrive state when the vehicle speed is high and the load is low, the fuel economy can be improved.

In this embodiment, the speed of rotation of the engine 1 is changed through switching between the HV HIGH mode and the HV LOW mode, and the resulting rotation is delivered, so that two mechanical points are provided, and the fuel efficiency can be improved. The mechanical point is a highly efficient operating point at which the entire power received by the planetary gear units 10, 20 is mechanically transmitted to the counter drive gear 25 without passing through any electric path.

In the drive system 1-1 for the hybrid vehicle according to this embodiment, the first planetary gear unit 10 can increase the speed of rotation of the engine 1, and deliver the rotation from the first ring gear 13. Accordingly, in addition to a mechanical point provided in the case where the first planetary gear unit 10 is not provided and the engine 1 is directly connected to the second carrier 24, the drive system 1-1 for the hybrid vehicle has another mechanical point on the high gear side. Namely, the drive system 1-1 for the hybrid vehicle has two mechanical points on the high gear side. Thus, the drive system 1-1 for the hybrid vehicle can realize a hybrid system with which the fuel economy can be improved through improvement of the transmission efficiency during high-speed running.

Also, the drive system 1-1 for the hybrid vehicle can inhibit rotation of the output element of the first planetary gear unit 10 and the input element of the second planetary gear unit 20, by engaging the clutch CL1 and the brake BK1 of the speed changing unit, so as to enable the vehicle to run in the both-drive EV mode. Therefore, there is no need to separately provide a clutch, or the like, for establishing the both-drive EV mode, and the arrangement of the system is simplified. With the above layout of this embodiment, the speed reduction ratio of the second rotating machine MG2 can be set to a large value. Also, a compact arrangement can be achieved by the FF or RR layout.

(Backward Running)

When the vehicle runs backward while the engine is running, the first rotating machine MG1 operates as a generator to generate electric power, and the second rotating machine MG2 operating as a motor rotates in the negative direction to produce negative torque, so as to run the vehicle backward. When the battery is in a sufficiently charged state, the second rotating machine MG2 may rotate alone in the reverse direction in the single-drive EV mode, to effect motor running. It is also possible to run the vehicle backward in the both-drive EV mode by fixing the second carrier 24.

(Coordinated Speed-Change Control)

Upon switching between the HV HIGH mode and the HV LOW mode, the HV_ECU 50 can perform coordinated speed-change control for changing the speed ratios of the first planetary gear unit 10 and the second planetary gear unit 20 at the same time. In the coordinated speed-change control, the HV_ECU 50 increases the speed ratio of one of the first planetary gear unit 10 and the second planetary gear unit 20, and reduces the speed ratio of the other.

Upon switching from the HV HIGH mode to the HV LOW mode, the HV_ECU 50 changes the speed ratio of the second planetary gear unit 20 to the higher gear side in synchronization with switching of the modes. This makes it possible to curb or reduce discontinuous change of the speed ratio in the whole system of the vehicle 100 from the engine 1 to the drive wheels 32, and reduce the degree of change of the speed ratio. By curbing change of the speed ratio in the system from the engine 1 to the drive wheels 32, it is possible to reduce the amount of adjustment of the engine speed caused by change of the speed ratio, or make the adjustment of the engine speed unnecessary. The HV_ECU 50 changes the speed ratios of the first planetary gear unit 10 and the second planetary gear unit 20 in coordination with each other, so as to continuously change the speed ratio of the vehicle 100 as a whole to the lower gear side.

Upon switching from the HV LOW mode to the HV HIGH mode, on the other hand, the HV_ECU 50 changes the speed ratio of the second planetary gear unit 20 to the lower gear side in synchronization with switching of the modes. This makes it possible to curb or reduce discontinuous change of the speed ratio in the vehicle 100 as a whole, and reduce the degree of change of the speed ratio. For example, the HV_ECU 50 changes the speed ratios of the first planetary gear unit 10 and the second planetary gear unit 20 in coordination with each other, so as to continuously change the speed ratio of the vehicle 100 as a whole to the higher gear side.

The speed ratio of the second planetary gear unit 20 is adjusted by controlling the rotational speed of the first rotating machine MG1, for example. For example, the HV_ECU 50 controls the first rotating machine MG1 so as to steplessly change the speed ratio between the input shaft 2 and the counter drive gear 25. Thus, the whole system including the planetary gear units 10, 20, first rotating machine MG1, clutch CL1 and the brake BK1, namely, a speed changing system including the differential unit and the speed changing unit, operates as an electric continuously variable transmission. Since the speed ratio of the speed changing system including the differential unit and the speed changing unit is variable in a wide range, the speed ratio from the differential unit to the drive wheels 32 can be set to a relatively large value. Also, power circulation during high-speed running in the HV running mode is reduced.

(Engine Start)

In the vehicle 100 according to this embodiment, the engine 1 can start by itself, and the engine 1 can also start the engine 1 using MG1 torque. The engine 1 can start by increasing its rotational speed without depending on torque from the outside, in other words, can start by itself in a condition where it is disconnected from the first rotating machine MG1, second rotating machine MG2, drive wheels 32, and so forth. The engine 1 of this embodiment is a direct-injection-type engine in which fuel is directly injected into cylinders. The engine 1 can start rotating with combustion energy of fuel generated in the cylinders, from a condition where its rotation is stopped, and complete starting after increasing the rotational speed.

When the engine speed increases, and the differential rotational speed of the clutch CL1 or brake BK1 becomes close to 0, the engaging device in question is engaged, so that the vehicle shifts to the HV running mode. For example, if the differential rotational speed of the clutch CL1 becomes close to 0, the clutch CL1 is engaged, so that the vehicle shifts to the HV LOW mode.

Also, the vehicle 100 can start the engine 1 (which will be called "assisted starting"), by cranking the engine through motoring for increasing the engine speed with MG1 torque. In the assisted starting, the engine 1 that is stopped starts being rotated by use of the MG1 torque, and the engine speed is increased so that the engine is started. As will be described below, when the engine 1 is started from the single-motor EV mode, it is desirable to reduce a lag in starting of the engine 1, and furthermore, it is preferable to achieve both reduction of electric power consumption (suppression of efficiency reduction), and reduction of the lag in starting of the engine 1. The vehicle 100 according to this embodiment is installed with the engine 1 that can start by itself, and can shift to HV running by quickly starting the engine with a reduced starting lag under conditions where the engine 1 can start by itself.

However, the engine 1 cannot start by itself in some cases. For example, the engine 1 cannot start by itself in the case where the temperature of the engine 1 is low, and the case where the stop positions of the pistons are not within a range in which the engine 1 can start by itself. For example, the engine_ECU 70 determines whether the engine 1 can start by itself, and outputs a signal indicative of whether the engine can or cannot start by itself, to the HV_ECU 50. When the engine 1 cannot start by itself, the engine 1 needs to be started using the MG1 torque. When the assisted starting is effected from the single-motor EV mode, a time lag in starting may be large, as will be described below.

In the single-motor EV mode, the vehicle runs with the clutch CL1 and the brake BK1 released, so that a drag loss of the first rotating machine MG1 can be reduced. Since the first rotating machine MG1 is stopped due to cogging torque, or the like, electric current for counterbalancing back electromotive force need not flow from the battery, and the electric power consumption is reduced. Generally, when torque is transmitted to the first rotating machine MG1, and the MG1 speed deviates from 0 rpm, an electric loss due to current (field-weakening current) that counterbalances back electromotive force, or a mechanical loss of a bearing appears. On the other hand, if the clutch CL1 and the brake BK1 are released in the single-motor EV mode, it is possible to curb transmission of torque to the first rotating machine MG1 and make the MG1 speed equal to 0; therefore, the electric loss or mechanical loss is less likely or unlikely to appear, and the electric power economy can be improved.

When assisted starting is effected from the condition where the clutch CL1 and the brake BK1 are released, it is necessary to engage the clutch CL1 or the brake BK1 so that torque can be transmitted from the first rotating machine MG1 to the engine 1. Therefore, in the assisted starting, the engine 1 is started by executing the steps of (1) making the rotational speed of the second carrier 24 equal to 0 through rotational speed control of the first rotating machine MG1, (2) engaging the clutch CL1 or the brake BK1, and (3) increasing the engine speed with the MG1 torque, for example. Accordingly, in the assisted starting, a larger amount of time is required for starting of the engine 1, as compared with the case of self-starting. The driver feels this delay as an engine starting lag.

The drive system 1-1 for the hybrid vehicle according to this embodiment has a first running condition and a second running condition in the single-motor EV mode, and can selectively establish the first running condition or the second running condition. The first running condition is a running condition in which the vehicle runs using the second rotating machine MG2 as a power source and differentially operating the first planetary gear unit 10 as the speed changing unit. In the first running condition, differential operation of the first planetary gear unit 10 is allowed, and the vehicle is able to run without rotating the first rotating machine MG1 as shown in FIG. 7, for example.

In the second running condition, the vehicle runs using the second rotating machine MG2 as a power source, without differentially operating the first planetary gear unit 10. As shown in FIG. 9, in the second running condition, the rotational speeds of the three rotational elements of the first planetary gear unit 10 are made equal. The drive system 1-1 for the hybrid vehicle establishes the second running condition, by stopping rotation of the second carrier 24 and the first ring gear 13, through rotational speed control of the first rotating machine MG1, and engaging the clutch CL1 or the brake BK1. In the second running condition, the clutch CL1 or the brake BK1 is engaged, so that the vehicle can run without differentially operating the first planetary gear unit 10. In the second running condition, the rotational speeds of the first sun gear 11 and the first ring gear 13 are equal to the rotational speed of the engine 1, namely, equal to 0. From the second running condition, the engine 1 can be started through cranking, with torque immediately transmitted from the first rotating machine MG1 to the engine 1. Accordingly, a lag in assisted starting can be reduced, and the response of engine starting can be improved.

In this embodiment, the first running condition is further divided into an MG-stopped first running condition and an MG-rotated first running condition. The MG-stopped first running condition is a running condition in which the vehicle runs while differentially operating the first planetary gear unit 10, without rotating the first rotating machine MG1, as shown in FIG. 7. The MG-rotated first running condition is a running condition in which the vehicle runs while differentially operating the first rotating machine MG1, and rotating the first rotating machine MG1, as shown in FIG. 10. The rotational speed (absolute value) of the second carrier 24 in the MG-rotated first running condition is smaller than the rotational speed (absolute value) of the second carrier 24 in the MG-stopped first running condition. In the MG-rotated first running condition, it is desirable that the MG1 rotational speed indicates negative rotation. In the MG-rotated first running condition, the lag in assisted starting can be reduced, to be smaller than that in the MG-stopped first running condition.

The required amount of change (see AN2 of FIG. 10) in the rotational speed of the second carrier 24 when the assisted starting is initiated from the MG-rotated first running condition is smaller than the required amount of change (see AN1 of FIG. 7) in the rotational speed of the second carrier 24 when the assisted starting is initiated from the MG-stopped first running condition. Accordingly, when the assisted starting is effected from the MG-rotated first running condition, the engine starting can be completed in a shorter time than that in the case where the assisted starting is effected from the MG-stopped first running condition.

In this embodiment, running regions in the case where the engine 1 can start by itself are specified, as shown in FIG. 11. Also, running regions in the case where the engine 1 cannot start by itself are specified, as shown in FIG. 12. In FIG. 11 and FIG. 12, the horizontal axis indicates the vehicle speed, and the vertical axis indicates output torque. The output torque is required torque or target torque based on the accelerator pedal angle, running conditions, running environment, etc.

As shown in FIG. 11, in the case where the engine 1 can start by itself, the running region is divided into an engine running region Reng in which the vehicle runs in the HV running mode, and an EV running region Rev in which the vehicle runs in the EV running mode. The engine running region Revn and the EV running region Rev are separated by a boundary line L1. The EV running region Rev is a region closer to the origin than the boundary line L1, and the engine running region Reng is a region on the opposite side of the boundary line L1 remote from the origin. Namely, the EV running mode is selected when the vehicle speed and the output torque are relatively low, and the HV running mode is selected when the vehicle speed and the output torque are relatively high. In this embodiment, in the case where the engine 1 can start by itself, the entire area of the EV running region Rev is a first EV running region Rev_1 in which the vehicle runs in the first running condition. Also, the entire area of the first EV running region Rev_1 is an MG-stopped running region Rev_1A in which the vehicle runs in the MG-stopped first running condition. Namely, in the single-motor EV mode in the case where the engine 1 can start by itself, the running condition as shown in the nomographic chart of FIG. 7 is selected.

As shown in FIG. 12, in the case where the engine 1 cannot start by itself, the running region is divided into an engine running region Reng in which the vehicle runs in the HV running mode, a first EV running region Rev_1 in which the vehicle runs in the first running condition of the EV running mode, and a second EV running region Rev_2 in which the vehicle runs in the second running condition of the EV running mode. The first EV running region Rev_1 is further divided into an MG-stopped running region Rev_1A and an MG-rotated running region Rev_1B. The MG-stopped running region Rev_1A is a running region in which the vehicle runs in the MG-stopped first running condition. The MG-rotated running region Rev_1B is a running region in which the vehicle runs in the MG-rotated first running condition.

The engine running region Reng and the second EV running region Rev_2 are separated by a boundary line L1. The second EV running region Rev_2 and the MG-rotated running region Rev_1B are separated by a boundary line L2. The MG-rotated running region Rev_1B and the MG-stopped running region Rev_1A are separated by a boundary line L3. In this embodiment, the MG-stopped running region Rev_1A, MG-rotated running region Rev_1B, second EV running region Rev_2, and the engine running region Reng are provided in the order of description, from the origin toward a high-vehicle-speed, high-output-torque region. With the running regions set in this manner, the electric power economy is prioritized when the vehicle runs in urban areas, etc. In urban areas, the electric power economy is often prioritized over reduction of the lag in engine starting. Also, in urban areas, the frequency of running at a low load is high. With the running regions set as shown in FIG. 12, the first running condition that is superior in terms of electric power economy is more likely to selected in a low-load region, than the second running region.

If the vehicle speed and the output torque are relatively lowest, the MG-stopped first running condition is selected. In this case, the vehicle runs without rotating the first rotating machine MG1, so that the highest priority can be given to improvement of the electric power economy and suppression of reduction of the efficiency. If the vehicle speed and the output torque are higher than those of the MG-stopped running region Rev_1A, the MG-rotated first running condition is selected. In this case, it is possible to reduce an engine starting lag in assisted starting, while making an attempt to improve the electric power economy and suppress reduction of the efficiency. If the vehicle speed and the output torque are higher than those of the MG-rotated running region Rev_1B, the second running condition is selected. In this case, it is possible to further prioritize reduction of the engine starting lag in assisted starting, as compared with the MG-rotated first running condition.

In this embodiment, when the engine 1 cannot start by itself, the region in which the vehicle runs in the second running condition is enlarged to be larger than that in the case where the engine 1 can start by itself. As a result, the lag or delay in starting of the engine 1 is reduced. As shown in FIG. 11, when the engine 1 can start by itself, the second EV running region Rev_2 is not provided. On the other hand, when the engine 1 cannot start by itself, the second EV running region Rev_2 is provided, as shown in FIG. 12, and the second EV running region Rev_2 is larger than that in the case where the engine 1 can start by itself. In other words, when the engine 1 can start by itself, the second EV running region Rev_2 is reduced as compared with the case where the engine 1 cannot start by itself, and the reduction includes making the area of the second EV running region Rev_2 equal to 0, or not providing the second EV running region Rev_2. With the second EV running region Rev_2 thus made larger when the engine 1 cannot start by itself, the starting lag when the engine 1 is started is reduced.

Referring to FIG. 1 and FIG. 13, control of this embodiment will be described. A control flow shown in FIG. 1 is repeatedly executed at given intervals during EV running, for example. The control flow shown in FIG. 1 may be executed when the vehicle runs in the single-motor EV running mode. In FIG. 13, (a) indicates a self-startability flag, (b) indicates engine speed, (c) indicates MG1 torque, (d) indicates MG1 speed, (e) indicates MG2 torque, (f) indicates MG2 speed, (g) indicates hydraulic pressure supplied to the clutch CL1, (h) indicates accelerator pedal angle, and (i) indicates vehicle speed.

Initially, in step S10, the HV_ECU 50 determines whether independent ignition starting is possible. In this embodiment, the HV_ECU 50 makes the determination of step S10, based on the self-startability flag received from the engine_ECU 70. The self-startability flag is set to ON when the engine 1 can start by itself, and is set to OFF when the engine 1 cannot start by itself. When the self-startability flag is ON, the HV_ECU 50 determines that the independent ignition starting is possible. If it is determined, as a result of determination in step S10, that the independent ignition starting is possible (step S10—Y), the control proceeds to step S60. If not (step S10—N), the control proceeds to step S20. In FIG. 13, at time t1, the self-startability flag switches from ON to OFF, and the engine changes from a condition where it is determined that independent ignition starting is possible, to a condition where it is determined that independent ignition starting is impossible. Up to time t1, the engine 1 can start by itself, and therefore, the vehicle runs in the MG1-stopped first running condition.

In step S20, the HV_ECU 50 determines whether the vehicle is running in the first EV running region Rev_1 or the second EV running region Rev_2. Referring to the map of running regions shown in FIG. 12, for example, the HV_ECU 50 determines which running region of the first EV running region Rev_1 and the second EV running region Rev_2 in which the operating point determined from the current vehicle speed and output torque lies. After execution of step S20, the control proceeds to step S30.

In step S30, the HV_ECU 50 determines whether the current operating point lies in the first EV running region Rev_1. If it is determined, as a result of the determination, that the current operating point lies in the first EV running region Rev_1 (step S30—Y), the control proceeds to step S50. If not (step S30—N), the control proceeds to step S40.

In step S40, the HV_ECU 50 executes running in the second EV running region Rev_2, namely, running in the second running condition. The HV_ECU 50 outputs the rotational speed at which rotation of the second carrier 24 can be stopped, to the MG_ECU 60, as a command value of the MG1 speed. After execution of step S40, this control flow ends. In FIG. 13, the second running condition is selected at time t1. As a result, over a period from time t1 to time t2, the MG1 torque is a negative torque, the MG1 speed indicates negative rotation, and the rotational speed increases. Here, during a shift to the second running condition, the MG1 torque is delivered to the second ring gear 23, due to drag torque or inertia torque of the shaft of the second carrier 24 and the first planetary gear unit 10. The MG2 torque is reduced so as to counterbalance the output torque, so that shock caused by torque variation is suppressed. At time t2, rotation of the second carrier 24 and the first ring gear 13 is stopped, and the clutch CL1 is engaged to place the first planetary gear unit 10 in a non-differential operating state, so that the shift to the second running condition is completed. The brake BK1 may be engaged, in place of the clutch CL1, so as to place the first planetary gear unit 10 in the non-differential operating state.

In step S50, the HV_ECU 50 determines whether the vehicle is running in the MG-stopped running region Rev_1A or the MG-rotated running region Rev_1B. Referring to the map of FIG. 12, the HV_ECU 50 determines which of the MG-stopped running region Rev_1A and the MG-rotated running region Rev_1B in which the current operating point lies. If the current operating point lies in the MG-stopped running region Rev_1A, the HV_ECU 50 sends a command to the MG_ECU 60 so as to stop the first rotating machine MG1. If, on the other hand, the current operating point lies in the MG-rotated running region Rev_1B, the HV_ECU 50 calculates a target value of the MG1 speed, and outputs the calculated target value to the MG_ECU 60 as a command value of the MG1 speed. The command value is at least higher than the rotational speed in the MG-stopped first running condition, and is calculated by a predetermined method. The command value of the MG1 speed in the MG-rotated first running condition may be a constant value, or may vary according to the vehicle speed, etc. After execution of step S50, this control flow ends.

In step S60, the HV_ECU 50 determines whether the vehicle is running in the first EV running region Rev_1. Since the engine 1 can start by itself, the HV_ECU 50 makes a determination on running regions, by referring to the map shown in FIG. 11. In the map shown in FIG. 11, the entire area of the EV running region Rev is the first EV running region Rev_1, and is also the MG-stopped running region Rev_1A. The HV_ECU 50 sends a command to the MG_ECU 60 so as to stop the first rotating machine MG1. After execution of step S60, this control flow ends.

As described above, when the engine 1 cannot start by itself, the drive system 1-1 for the hybrid vehicle according to this embodiment enlarges the region in which the vehicle runs in the second running condition, so that the region becomes larger than that in the case where the engine 1 can start by itself. Thus, reduction of the efficiency of the vehicle 100 can be suppressed, and the delay in engine starting can also be reduced.

Also, the region in which the vehicle runs in the first running condition has the MG-rotated running region Rev_1B in which the vehicle runs while rotating the first rotating machine MG1, and the MG-stopped running region Rev_1A in which the vehicle runs without rotating the first rotating machine MG1. With the two running regions Rev_1A, Rev_1B used depending on the case, the running condition in which suppression of reduction in the efficiency of the vehicle 100 is relatively prioritized, and the running condition in which reduction of the delay in engine starting is relatively prioritized can be selectively established.

While the second EV running region Rev_2 is not provided in the case where the engine 1 can start by itself in this embodiment, the second EV running region Rev_2 may be provided in the case where the engine 1 can start by itself. However, the second EV running region Rev_2 in the case where the engine 1 can start by itself is made smaller than the second EV running region in the case where the engine 1 cannot start by itself.

In this embodiment, in the case where the engine 1 can start by itself (see FIG. 11), the first EV running region Rev_1 and the engine running region Reng are provided adjacent to each other. Instead, the region in which the vehicle runs in the both-drive EV mode may be provided between the first EV running region Rev_1 and the engine running region Reng. Also, in the case where the engine 1 cannot start by itself (see FIG. 12), the second EV running region Rev_2 and the engine running region Reng are provided adjacent to each other. Instead, the region in which the vehicle runs in the both-drive EV mode may be provided between the second EV running region Rev_2 and the engine running region Reng.

In this embodiment, self-starting of the engine 1 means that the engine 1 autonomously start without receiving assist torque from the outside until engine starting is completed. However, in self-starting of the engine 1, the increase of the engine speed may be assisted by MG1 torque after engagement of the clutch CL1 or the brake BK1. That is, self-starting may include the case where the increase of the engine speed is assisted by the MG1 torque while the engine speed is being increased, so that engine starting is completed. Namely, a starting method in which the engine 1 at least starts increasing the engine speed autonomously and reaches completion of engine starting may be called self-starting.

In this connection, the engine_ECU 70 may determine that the engine 1 cannot start by itself, under a situation where the engine 1 can start by itself, but starting shock is large. Also, the engine 1 may include a starter. In this case, self-starting of the engine 1 includes starting by means of the starter. When the starter fails, the engine_ECU 70 determines that the engine 1 cannot start by itself.

First Modified Example of Embodiment

Figure 14:
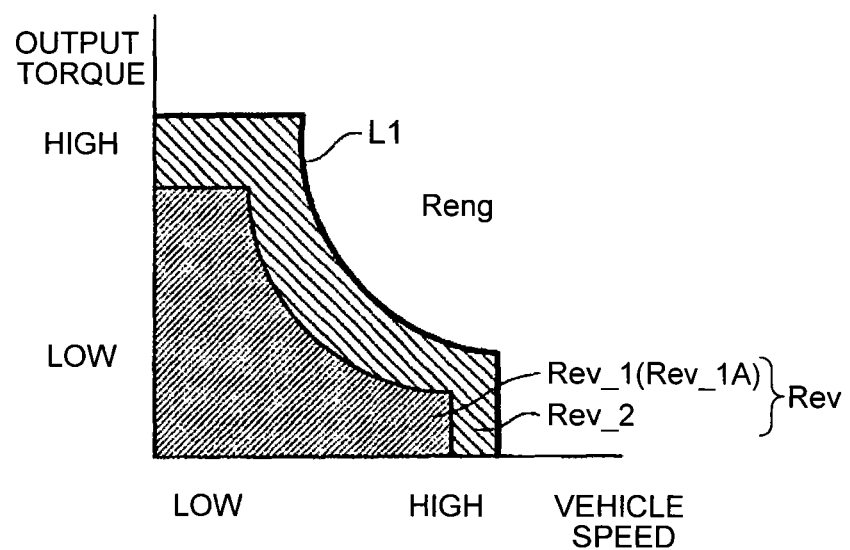
FIG. 14 is a view showing running regions according to a first modified example of the embodiment.

While the first EV running region Rev_1 has the MG-stopped running region Rev_1A and the MG-rotated running region Rev_1B in the above embodiment, the first EV running region Rev_1 may be either one of the MG-stopped running region Rev_1A and the MG-rotated running region Rev_1B. FIG. 14 is a view showing running regions according to a first modified example of the embodiment. In the first modified example, the entire area of the first EV running region Rev_1 is set as the MG-stopped running region Rev_1A. Instead, the entire area of the first EV running region Rev_1 may be set as the MG-rotated running region Rev_1B.

As one example, the entire area of the first EV running region Rev_1 may be set as the MG-stopped running region Rev_1A as shown in FIG. 14, when a driver's intention to accelerate the vehicle is small, and the entire area of the first EV running region Rev_1 may be set as the MG-rotated running region Rev_1B when the driver's intention to accelerate the vehicle is large. The magnitude of the driver's intention to accelerate the vehicle can be detected or estimated based on, for example, the selected mode, acceleration applied to the vehicle, the rate of change of the accelerator pedal angle, shifting operation, and so forth.

For example, in a vehicle that can be selectively placed in a power mode, a normal mode, or an economy mode, through a pushing operation on a switch, or the like, when the power mode is selected, it is determined that the intention to accelerate the vehicle is larger than that in the case where the normal mode or the economy mode is selected. It can be determined that the driver has a large intention to accelerate the vehicle when he/she performs a driving operation so that the acceleration/deceleration G of the vehicle 100 or the lateral G caused by turning becomes large. When the rate of increase of the accelerator pedal angle is large, it can be determined that the intention to accelerate the vehicle is larger than that in the case where the rate of increase of the accelerator pedal angle is small. Also, when a lower-speed gear position is selected, it can be determined that the intention to accelerate the vehicle is larger than that in the case where a higher-speed gear position is selected. Also, the shifting operation to shift the transmission to a lower-speed gear position can be determined as indicating an increase of the intention to accelerate the vehicle.

Also, when it is determined based of the state of charge SOC of the battery that the remaining amount of charge of the battery is small, the electric power economy is prioritized, and the entire area of the first EV running region Rev_1 is set as the MG-stopped running region Rev_1A. When the remaining amount of charge of the battery is large, reduction of the engine starting lag is prioritized, and the entire area of the first EV running region Rev_1 is set as the MG-rotated running region Rev_1B.

Second Modified Example of Embodiment

When the engine cannot start by itself, the region in which the vehicle runs in the second running condition may be variable. For example, the size of the second EV running region Rev_2 may be changed according to the magnitude of the driver's intention to accelerate the vehicle. For example, when the driver's intention to accelerate the vehicle is large, the second EV running region Rev_2 is larger than that in the case where the driver's intention to accelerate the vehicle is small. For example, the second EV running region Rev_2 may be enlarged by enlarging the second EV running region Rev_2 toward the low-vehicle-speed side or low-output-torque side. Also, the second EV running region Rev_2 in the case where the remaining amount of charge of the battery is large may be made larger than the second EV running region Rev_2 in the case where the remaining amount of charge of the battery is small.

Third Modified Example of Embodiment

When the engine cannot start by itself, the MG-rotated running region Rev_1B may be variable. For example, the size of the MG-rotated running region Rev_1B may be changed according to the magnitude of the driver's intention to accelerate the vehicle. For example, the MG-rotated running region Rev_1B in the case where the intention to accelerate the vehicle is large is larger than the MG-rotated running region Rev_1B in the case where the intention to accelerate the vehicle is small. For example, the MG-rotated running region Rev_1B may be enlarged by enlarging the MG-rotated running region Rev_1B toward the low-vehicle-speed side or low-output-torque side. Also, the MG-rotated running region Rev_1B in the case where the remaining amount of charge of the battery is large may be made larger than the MG-rotated running region Rev_1B in the case where the remaining amount of charge of the battery is small.

Fourth Modified Example of Embodiment

In the MG-rotated running region Rev_1B, the rotational speed of the second carrier 24 and the first ring gear 13 may be variable. For example, in the MG-rotated running region Rev_1B, the rotational speed of the second carrier 24 is smaller in a region close to the second EV running region Rev_2, than that in a region remote from the second EV running region Rev_2. As one example, in the MG-rotated running region Rev_1B, the rotational speed of the second carrier 24 may be reduced as the operating point moves from the MG-stopped running region Rev_1 side to the second EV running region Rev_2 side.

The power transmission system as described below is disclosed, according to the above-described embodiment and respective modified examples.

"The power transmission system consisting of the engine, speed changing unit, and the differential unit comprised of three shafts, wherein the output shaft of the engine is coupled to the input shaft of the speed changing unit, the output shaft of the speed changing unit is coupled to a first shaft of the differential unit, the first rotating machine is coupled to a second shaft of the differential unit, and the second rotating machine is coupled to a third shaft, and wherein first rotating machine running in which the speed changing unit performs differential operation and second rotating machine running in which the speed changing unit does not perform differential operation are possible, the engine starts by itself or starts with an aid of the first rotating machine, and a region of the second rotating machine running is larger in the case where the engine cannot start by itself, than that in the case where the engine can start by itself."

The contents disclosed in the above embodiment and respective modified examples may be implemented in combination as needed.

EXPLANATION OF REFERENCE NUMERALS 1-1 drive system for hybrid vehicle
1 engine
10 first planetary gear unit
11 first sun gear
13 first ring gear
14 first carrier
20 second planetary gear unit
21 second sun gear
23 second ring gear
24 second carrier
32 drive wheels
50 HV_ECU
60 MG_ECU
70 engine_ECU
100 vehicle
MG1 first rotating machine
MG2 second rotating machine
Reng engine running region
Rev EV running region
Rev_1 first EV running region
Rev_1A MG-stopped running region
Rev_1B MG-rotated running region
Rev_2 second EV running region

The invention claimed is:

1. A drive system for a hybrid vehicle, the drive system comprising:
an engine configured to start by itself by starting rotating of the engine with combustion energy of a fuel generated in a cylinder from a condition in which rotation is stopped, and increasing a rotational speed to complete starting;
a first differential mechanism connected to the engine, the first differential mechanism configured to transmit rotation of the engine;
a second differential mechanism to connect the first differential mechanism with drive wheels,
the second differential mechanism including a first rotational element, a second rotational element, and a third rotational element, the first rotational element connected to an output element of the first differential mechanism, the second rotational element connected to a first rotating machine, and the third rotational element connected to a second rotating machine and the drive wheels;
a switching device to change a speed ratio of the first differential mechanism; and
an electronic control unit configured to selectively establish a first running condition and a second running condition, the first running condition being a running condition in which the hybrid vehicle runs using the second rotating machine as a power source, in a condition in which the switching device allows differential operation of the first differential mechanism,
the second running condition being a running condition in which the hybrid vehicle runs using the second rotating machine as a power source, in a condition in which the switching device inhibits operation of the first differential mechanism, and
a running region in which the hybrid vehicle runs in the second running condition in a case where the engine cannot start by itself, is larger than a running region in which the hybrid vehicle runs in the second running condition in a case where the engine can start by itself.

2. The drive system according to claim 1, wherein the running region in which the hybrid vehicle runs in the second running condition is a higher-load-side running region than a running region in which the hybrid vehicle runs in the first running condition.

3. The drive system according to claim 1, wherein when the engine cannot start by itself, a running region in which the hybrid vehicle runs in the first running condition has a running region in which the hybrid vehicle runs while rotating the first rotating machine, and a running region in which the hybrid vehicle runs without rotating the first rotating machine.

4. The drive system according to claim 1, wherein the running region in which the hybrid vehicle runs in the second running condition in a case where a driver's intention to accelerate the hybrid vehicle is large is larger than that in a case where the driver's intention to accelerate the hybrid vehicle is small.

5. The drive system according to claim 3, wherein the running region in which the hybrid vehicle runs while rotating the first rotating machine is larger in the case where the driver's intention to accelerate the hybrid vehicle is large than that in the case where the driver's intention to accelerate the hybrid vehicle is small.

6. The drive system according to claim 3, wherein the running region in which the hybrid vehicle runs while rotating the first rotating machine is provided between the running region in which the hybrid vehicle runs without rotating the first rotating machine, and the running region in which the hybrid vehicle runs in the second running condition, and a rotational speed of the first rotational element is smaller in a running region which is within the running region in which the hybrid vehicle runs while rotating the first rotating machine and close to the running region in which the hybrid vehicle runs in the second running condition, than in a running region which is within the running region in which the hybrid vehicle runs while rotating the first rotating machine and remote from the running region in which the hybrid vehicle runs in the second running condition.

* * * * *